United States Patent [19]

Vick et al.

[11] 3,856,936
[45] Dec. 24, 1974

[54] COMPOSITION AND METHOD FOR CORTISOL CONTROL

[75] Inventors: James A. Vick; Charles S. Castner, both of Reading, Pa.

[73] Assignee: Schuyler Development Corporation, Reading, Pa.

[22] Filed: May 7, 1973

[21] Appl. No.: 357,670

[52] U.S. Cl. ................................................. 424/98
[51] Int. Cl. .......................................... A61k 17/00
[58] Field of Search ...................................... 424/98

[56] References Cited
UNITED STATES PATENTS

| | | | |
|---|---|---|---|
| 2,075,390 | 3/1937 | Forster | 424/98 |
| 2,154,934 | 4/1939 | Hahn | 424/98 |

OTHER PUBLICATIONS

Robinson, J. of Economic Entomology, Vol. 30, 1937, pp. 41–43.
The Merck Index, 8th Ed., (1968), pp. 651 & 1033, published by Merck & Co., Inc., Rahway, N.J.

*Primary Examiner*—Sam Rosen
*Attorney, Agent, or Firm*—Buell, Blenko and Ziesenheim

[57] ABSTRACT

A composition and method for controlling cortisol levels in mammals is provided in which a mixture of a member from the group whole bee venom and mellitin and partially hydrolyzed cocoa butter is topically applied to the mammal being treated.

8 Claims, No Drawings

COMPOSITION AND METHOD FOR CORTISOL CONTROL

This invention relates to a composition and method for cortisol control and particularly to composition and method for cortisol control in mammals such as dogs, monkeys and humans.

The plasma cortisol level in mammals has been recognized for some time to have an influence on various bodily functions and ailments, such as, for example, arthritis. The only presently known method of raising the plasma cortisol level up to the present time is by introduction of cortisone, derived from other mammals, into the mammal being treated. This is expensive, it is limited to extractable amounts of cortisone derived from slaughtered mammals and is subject to some problems of adverse reaction by the mammal body being treated.

We have invented a novel composition and method for causing the treated mammal body to create its own cortisol requirements. We have found that the plasma cortisol levels in mammals can be raised by the simple expedient of rubbing onto an exposed area of epidermis a composition made up of partially hydrolyzed cocoa butter and whole bee venom or the fraction of bee venom known as mellitin.

Preferably, we provide a composition made up of partially hydrolyzed cocoa butter fatty acids and one of the group consisting of whole bee venom and the mellitin fraction of bee venom. Preferably, this mixture is rubbed onto a portion of epidermis of the mammal being treated and permitted to be absorbed through the skin. A broad general composition for use in this invention would consist of about 0.05% to 1% of whole bee venom or mellitin in sufficient hydrolyzed cocoa butter fatty acids to provide 100%. Preferably the whole bee venom or mellitin is dissolved in sterile saline solution and added to the cocoa butter fatty acids at about 80°F. after which the mixture is cooled to form a solid. The resulting solid is rubbed onto the epidermis of the mammal being treated.

The invention here can perhaps best be understood by reference to the following example which illustrates both the preferred form of composition and the method of use as well as the efficacy of this invention:

EXAMPLE

A series of 20 adult Beagle dogs were used to study the effects of a whole bee venom composition according to this invention on plasma cortisol levels. The dogs were anesthetized with Na pentobarbital 30 mg/kg and instrumented to record arterial blood pressure, electrocardiogram heart rate and respiratory function. In addition blood samples were drawn at 30 minute intervals for a total of 8 hours for determination of plasma cortisol levels (method of Clark and Rubin, 1969). Following a control period of 1 hour the bee venom and cocoa butter composition of this invention was applied to the abdominal wall of the dogs. 10 cc of cocoa butter fatty acids was heated to 80°F. at which temperature it became liquid. 10 mg whole bee venom was first dissolved in 1 cc sterile saline and then added to the liquid cocoa butter. After thorough mixing the bee venom-cocoa butter composition was allowed to cool to room temperature and applied to the abdominal wall using sterile surgical gloves. A 10 cc portion was prepared for each test dog. The entire 10 cc solution was absorbed through the skin of the dog within 30 minutes. The effect of the venom-cocoa butter on plasma cortisol levels is shown in Table I.

Table I

|  | Control | ½ hr | 1 hr | 1½ hr | 2 hr | 2½ hr | 3 hr | 3½ hr | 4 hr |
|---|---|---|---|---|---|---|---|---|---|
| Plasma cortisol levels | 5.4 | 5.0 | 4.8 | 5.5 | 6.5 | 7.9 | 8.9 | 10.0 | 14.6 |
|  |  | 4½ hr | 5 hr | 5½ hr | 6 hr | 6½ hr | 7 hr | 7½ hr | 8 hr |
| ug/100 ml |  | 16.4 | 17.0 | 16.0 | 14.3 | 12.8 | 12.0 | 12.4 | 12.9 |

No significant change in any of the vital physiological functions monitored were observed at any time following venom-cocoa butter applications.

The foregoing results show the marked increase in cortisol level brought about by the composition and method of this invention.

What is most remarkable is the effect of the composition in passing through the epidermis of the dogs without need for any injection procedures. The cocoa butter fatty acids appear to have the ability to carry the relatively large bee venom molecules through the epidermal layers without any need for puncturing the epidermis and without any adverse effect on the normal physiological functions of the dogs.

The partially hydrolyzed cocoa butter fatty acids here used were produced by partial hydrolysis of cocoa butter. This was accomplished by first partially converting cocoa butter to a soap by reacting the natural cocoa butter with an alkali such as sodium hydroxide or potassium hydroxide in an amount insufficient to react all of the cocoa butter so that a part of the cocoa butter is not converted to soap. The resulting soap and unreacted cocoa butter is recovered and treated with a mineral acid such as hydrochloric acid in an amount sufficient to react with the soap to form free fatty acids with a portion of unreacted cocoa butter. The resultant product may have from 2 to 50% unreacted cocoa butter mixed with the free fatty acids without detrimentally affecting the end result.

The hydrolysis reactions by which the cocoa butter is first converted to soaps and then to free fatty acids are well known. They are the same reactions by which soaps and free fatty acids have been historically made from natural fats and oils. The difference lies in the fact that the materials here referred to as cocoa butter fatty acids are produced by a partial hydrolysis of the cocoa butter rather than complete hydrolysis as is conventionally carried out in soap making and in the manufacture of free fatty acids.

Typically the cocoa butter fatty acids used in this invention may be made by melting natural cocoa butter in hot water and saponified by the addition of sodium hydroxide to a pH in the range 10.5 to 11.5. This results in an incomplete saponification producing a mixture of soap and unsaponified cocoa butter. This mixture is then acidified with hydrochloric acid to a pH of about 4.5, washed and recovered. The resultant product has an average analysis of:

| | |
|---|---|
| Palmitic and Palmitoleic acids | About 26% |
| Stearic acid | About 23% |
| Oleic, Linoleic and Linolenic acids | About 50% |
| Arachidic acid | About 1% |

It will be recognized that, while we have illustrated certain preferred practics and embodiments of our invention in the foregoing specification, the invention may be otherwise embodied within the scope of the following claims.

We claim:

1. A composition for cortisol level control in mammals by topical application consisting essentially of an effective amount of a member selected from the group consisting of whole bee venom and mellitin in a mixture of cocoa butter fatty acids containing 2 to 50% unreacted cocoa butter produced by partial hydrolysis of cocoa butter.

2. A composition as claimed in claim 1 wherein whole bee venom is admixed with a mixture of cocoa butter fatty acids containing 2 to 50% unreacted cocoa butter produced by partial hydrolysis of cocoa butter.

3. A composition as claimed in claim 2 containing about 0.05 to 1% by weight of whole bee venom.

4. A composition as claimed in claim 1 wherein mellitin is admixed with a mixture of cocoa butter fatty acids containing 2 to 50% unreacted cocoa butter produced by partial hydrolysis of cocoa butter.

5. A composition as claimed in claim 4 containing about 0.05 to 1% by weight of mellitin.

6. A method of controlling cortisol levels in mammals comprising applying to an epidermal area of a mammal to be treated an effective amount of a mixture consisting essentially of a member from the group consisting of whole bee venom and mellitin in partially hydrolyzed cocoa butter containing 2 to 50% unreacted cocoa butter.

7. A method as claimed in claim 6 wherein the concentration of whole bee venom or mellitin in the mixture of cocoa butter fatty acids and cocoa butter is about 0.05 to 1% by weight.

8. A method as claimed in claim 6 using whole bee venom.

* * * * *